United States Patent [19]

Howell

[11] Patent Number: 5,082,514

[45] Date of Patent: Jan. 21, 1992

[54] METHOD FOR PRODUCING FIBER REINFORCED POLYMER BEAMS, INCLUDING LEAF SPRINGS

[76] Inventor: William B. Howell, 14652W River Oaks Dr., Lincolnshire, Ill. 60069

[21] Appl. No.: 514,872

[22] Filed: Apr. 26, 1990

[51] Int. Cl.$^5$ .................... B65H 81/00; F16F 1/18; F16F 1/36

[52] U.S. Cl. .................... 156/175; 156/169; 156/173; 156/425; 267/36.1; 267/47; 267/148; 267/149

[58] Field of Search .......... 267/47, 36.1, 148, 149; 156/169, 172, 173, 175, 425, 430, 441

[56] References Cited

U.S. PATENT DOCUMENTS

| | | | |
|---|---|---|---|
| 3,056,706 | 10/1962 | Knoppel | 267/148 |
| 3,649,401 | 3/1972 | Gunnerson | 156/175 |
| 3,772,126 | 11/1973 | Myers | 156/441 X |
| 4,062,717 | 12/1977 | McClean | 156/425 |
| 4,114,962 | 9/1978 | Konig et al. | 156/172 X |
| 4,118,262 | 10/1978 | Abbott | 156/175 |
| 4,137,354 | 1/1979 | Mayes, Jr. et al. | 156/175 X |
| 4,289,564 | 9/1981 | Hanaford et al. | 156/425 |
| 4,374,689 | 2/1983 | Smith et al. | |
| 4,376,669 | 3/1983 | Math | |
| 4,414,049 | 11/1983 | Jones | |
| 4,529,139 | 7/1985 | Smith et al. | |
| 4,681,647 | 7/1987 | Kondo et al. | 156/172 |
| 4,695,342 | 9/1987 | Belleau et al. | 156/173 |
| 4,867,825 | 9/1989 | Gidge | 156/441 X |

OTHER PUBLICATIONS

Filament Winding: Its Development, Manufacture, Applications & Design D. V. Rosato and C. S. Grove Jr.
Composite Fabrication by Filament Winding Stanley T. Peters and Brian E. Spencer.
Glass Fiber Reinforced Epoxy Leaf Spring Design, W. G. Gottenberg and K. H. Lo.
For Spring Action . . . which Cantilever Beam is Best?, Dr. Karl Maier, Filament Winding, Raymond C. Hayes.

Primary Examiner—Michael W. Ball
Assistant Examiner—Jeff H. Aftergut
Attorney, Agent, or Firm—Lee, Mann, Smith, McWilliams & Sweeney

[57] ABSTRACT

A fiber reinforced polymer beam may be manufactured by winding one or more strands of resin coated fibers about four pins mounted upon a winding fixture, each pin being independently translatable along the winding fixture and being independently extendable into, and retractable out of, the winding fixture. As the fiber is wound around the two exterior pins the interior pins will retract and translate to positions exterior of the pins being wound and will then extend to receive the next wrap of fiber. As the exterior pins are wound the interior pins continue to be translated to a position outside of the pins being wound so as to be in position to receive the next wrap of the fibers.

3 Claims, 3 Drawing Sheets

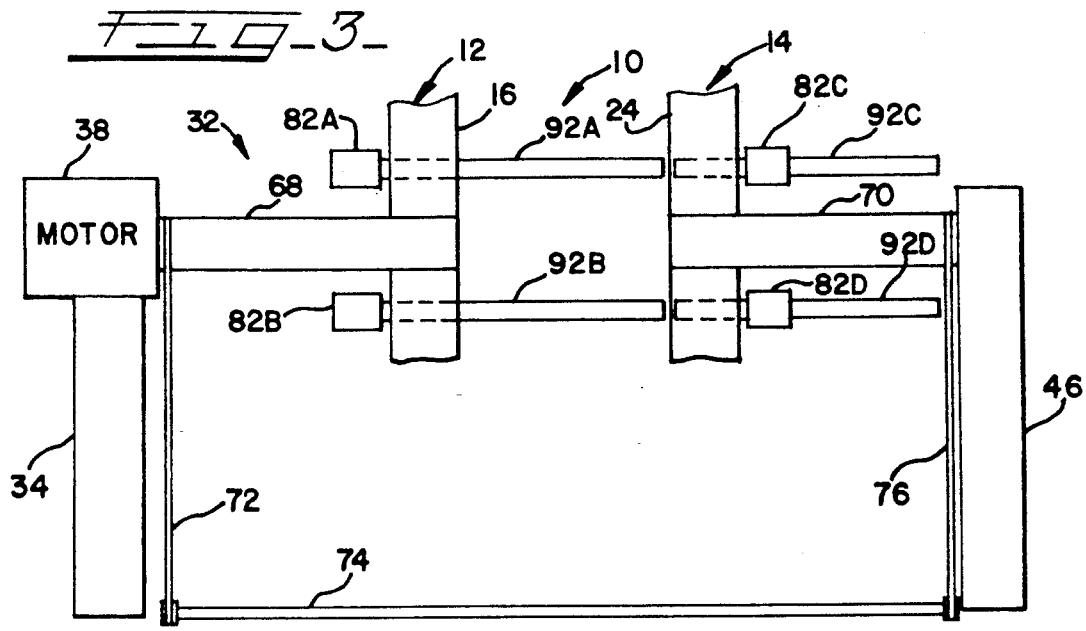
FIG-3-
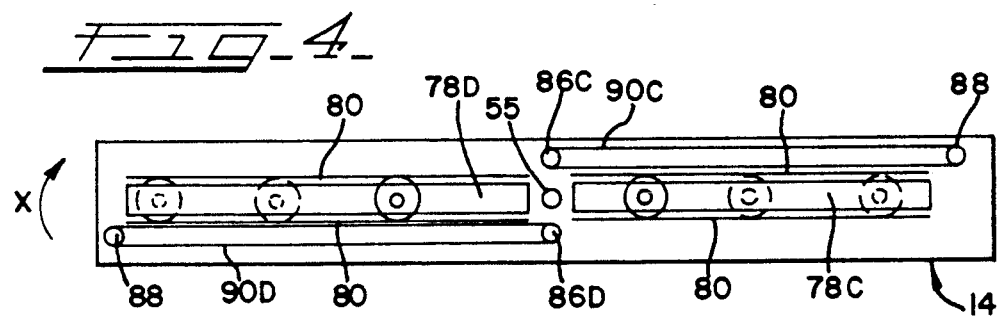
FIG-4-
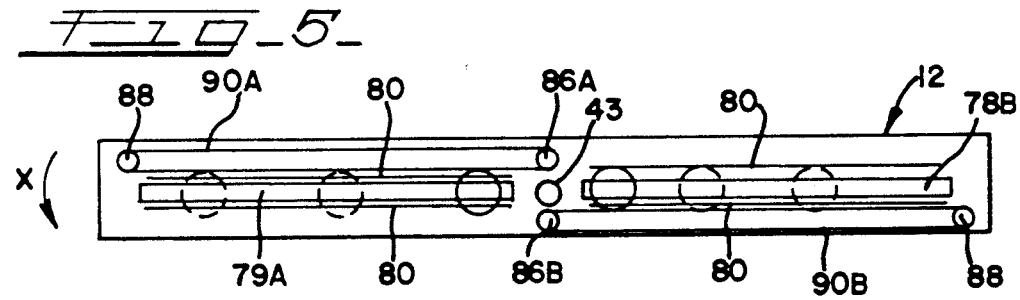
FIG-5-
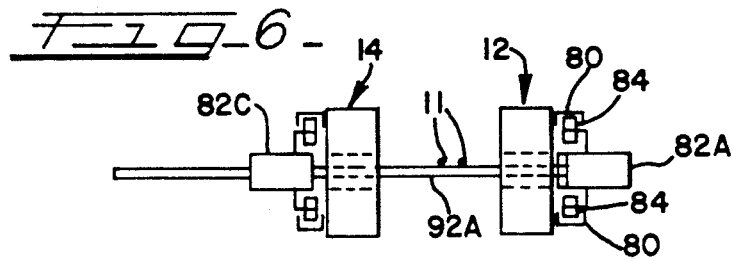
FIG-6-

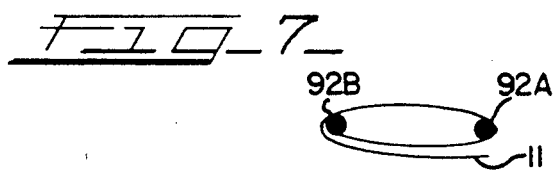
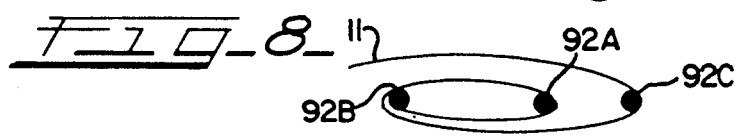
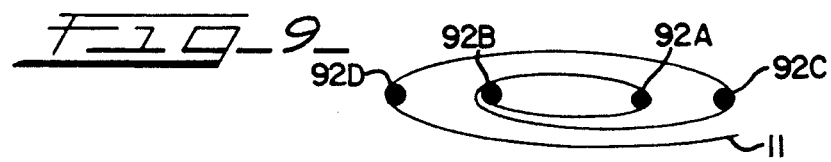
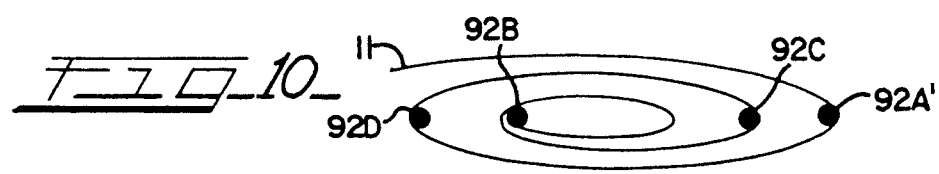
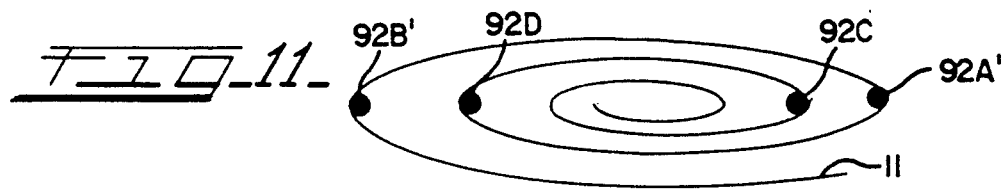
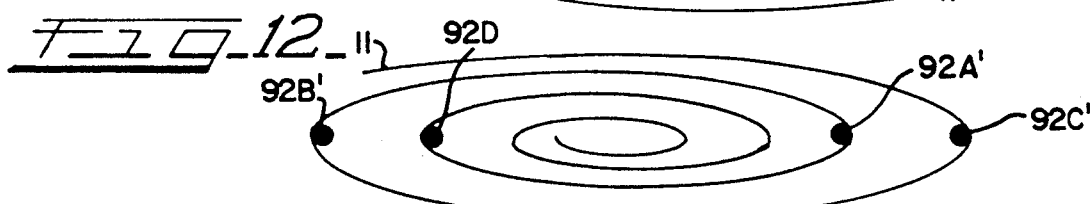
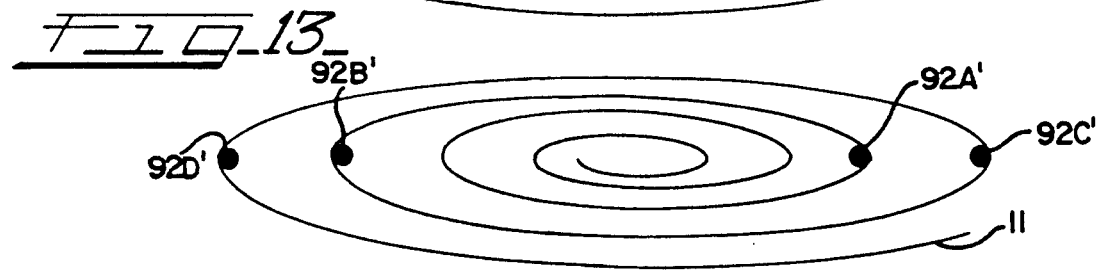
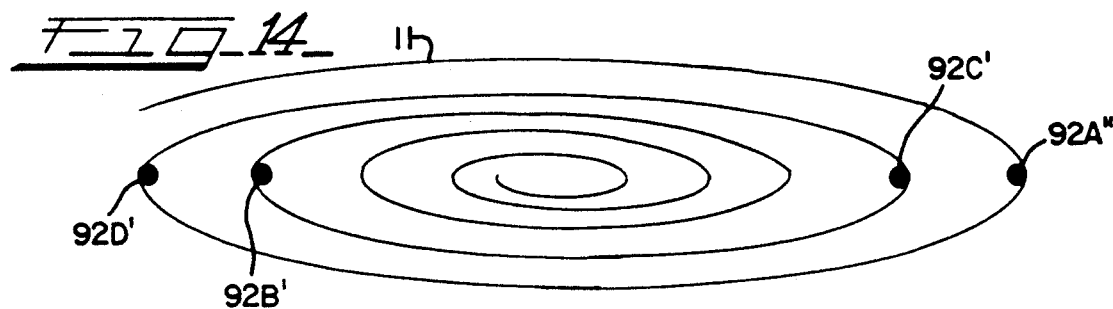

METHOD FOR PRODUCING FIBER REINFORCED POLYMER BEAMS, INCLUDING LEAF SPRINGS

BACKGROUND OF THE INVENTION

Fiber reinforced polymer beams, such as leaf springs, may be produced by various means, including filament winding, pultrusion, and the individual placement by hand or machine of multiple layers of resin impregnated fibers. (See for example U.S. Pat. Nos. 4,374,689; 4,376,669; 4,529,139; and 4,414,049.) While the individual placing of each layer of fibers offers great freedom in shaping the beam, this approach is relatively slow and expensive. The alternatives of filament winding and pultrusion are faster and less expensive, but inherently result in beams of constant cross sectional area unless supplemented by subsequent processes to reshape the beam and trim away extraneous material. These supplemental processes result in fiber discontinuity and the loss of material as unrecoverable scrap. (See Gottenberg, W. G. and K. H. Lo; *Glass Fiber Reinforced Epoxy Leaf Spring Design;* 38th Annual Conference, Reinforced Plastics/Composites Institute, The Society of the Plastics Industry, Inc., Febr. 7-11, 1983.)

In the pultrusion process, fibers are drawn through a resin bath and then into a heated die for curing. This results in a beam of constant cross sectional area and shape. If the die is not heated, the resin impregnated material will remain pliable, allowing it to be reshaped and cured in a compression mold. The resulting beam may have a varying cross sectional shape throughout its length, but will continue to have a constant cross sectional area unless trimmed.

Filament winding, like pultrusion, involves drawing fibers through a resin bath. Then, typically, these fibers are wound continuously around and around a mandrel which may be oval (or "football") shaped in cross section. This forms, at one time, two springs connected to each other at both ends. These connections are severed to form individual springs. The fibers may be wound into a die to form a beam of varying cross sectional shape but, as with pultruded beams, the continuity of fiber from one end to the other results in constant cross sectional area unless trimmed.

The disadvantage of a constant cross sectional area may be understood be referring to an article by Dr. Carl Maier, "For Spring Action, Which Cantilever Beam is Best", *Product Engineering*, Febr. 17, 1958, pages 83-87. There it was disclosed that optimum beams are characterized by uniform stress distribution over their length. Two such ideal beams with a rectangular cross section are found: 1) triangular—having constant thickness and a triangular profile in the horizontal plane, and 2) parabolic—having constant width and a parabolic profile in th vertical plane. While the triangular shape is impractical to use in most applications, the parabolic shape stores the maximum amount of energy per unit of volume and thus is the ideal in spring design.

A method of forming a parabolic spring by filament winding is disclosed in U.S. Pat. No. 4,414,049. In this method the fibers are wrapped around a set of innermost pins and thereafter a second set of pins are inserted into the winding fixture and the fibers are wrapped around these pins. Next, a third set of pins are inserted and the fibers are wrapped around these pins. Pins continue to be inserted as each wrap of fibers is completed. In this method, once the pins are inserted into the winding fixture they remain in place until the winding process is completed. Once the winding is completed the pins are removed from the winding fixture so that the fixture may be heated to cure the resin.

A heavy-duty beam may incorporate 100 loops or more of fibers. To achieve a smooth and gradual reduction in the thickness of the beam, each set of pins as shown in U.S. Pat. No. 4,414,049 should receive only one loop of fibers. This method would then require 50 sets of pins to create a beam having 100 loops.

The winding fixture of the present invention uses only two sets of translatable pins. As the pins are translatable the pins may be located in a vast number of different configurations within a single fixture. The present invention also allows the two pins of each set of pins to be placed at variable spacings from adjacent one another to widely apart. The present winding fixture also eliminates the need for trimming and the resultant fiber discontinuity and material waste. This method of winding also offers the advantage of having the fiber direction co-directional with the beam surface, rather than with the beam centerline, thereby providing strength in the direction in which stress is induced by bending.

SUMMARY OF THE INVENTION

The present invention provides a winding fixture having two frames rotatable on a shaft. The winding fixture includes two sets of repositionable pins. Each set of pins includes two pins with one pin from each set being located on a respective frame. Each pin may be repositioned by selectively extending or retracting each pin relative to the frames. Each pin is mounted to a frame on a track so as to also be independently repositionable by translating along the frames. After one or more initial wraps of the fibers has been made around the innermost pins of each set of pins, the remaining pin from each set of pins is extended into the frames whereupon a second series of one or more wraps of the fibers is wound around these pins. The innermost pins are then retracted and translated along the frames to an exterior position whereupon they are extended into the frames to receive a third series of wraps of the fiber material. The pins which formed guides for the second series of wraps of the fiber material, which are now the interior pins, are then retracted and are translated along the frames to an exterior position whereupon they are extended to receive the fourth series of wraps of the fiber material. The process of alternately translating the interior pins to an exterior position along the frames is continued until the final wrap of the fiber material is made.

DESCRIPTION OF THE DRAWINGS

FIG. 3 is an elevational view of an alternative embodiment of the drive mechanism showing the winding fixture partially broken away.

FIG. 4 shows a side elevational view of the winding fixture taken along lines 4—4 of FIG. 1.

FIG. 5 shows a side elevational view of the winding fixture taken along lines 5—5 of FIG. 1.

FIG. 6 is an end elevational view of the winding fixture taken along lines 6—6 of FIG. 1.

FIG. 7 shows the location of the extended pins during the first series of wraps of the fibers.

FIG. 8 shows the location of the extended pins during the second series of wraps of the fibers.

FIG. 9 shows the location of the extended pins during the third series of wraps of the fibers.

FIG. 10 shows the location of the extended pins during the fourth series of wraps of the fibers.

FIG. 11 shows the location of the extended pins during the fifth series of wraps of the fibers.

FIG. 12 shows the location of the extended pins during the sixth series of wraps of the fibers.

FIG. 13 shows the location of the extended pins during the seventh series of wraps of the fibers.

FIG. 14 shows the location of the extended pins during the eighth series of wraps of the fibers.

DESCRIPTION OF THE PREFERRED EMBODIMENT

Figure 1:
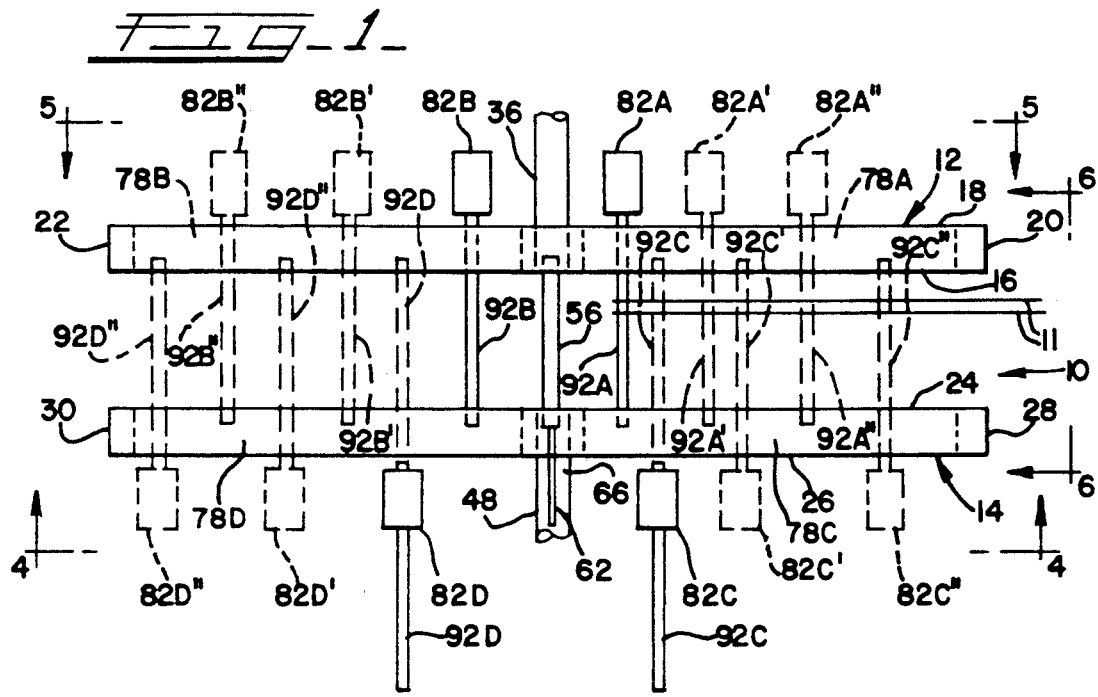
FIG. 1 is a plan view of the winding fixture with the pins shown in their initial positions in solid lines and in subsequent positions in phantom.

FIG. 1 shows a winding fixture 10 for use in winding one or more fibers 11 into a fiber reinforced structure. The fibers 11 consist of filaments and resins which are well known in the art. The fixture 10 includes a first frame 12 and a second frame 14. The first frame 12 has an interior surface 16, an exterior surface 18, a first end 20 and a second end 22. The second frame 14 has an interior surface 24, an exterior surface 26, a first end 28 and a second end 30. The frames 12 and 14 are spaced parallel to each other with interior surface 16 opposing interior surface 24. The distance between the interior surfaces 16 and 24 may be varied to obtain fiber reinforced structures of different widths as desired. The fibers 11 are arranged side-by-side such that the width of the plurality of fibers 11 equals the width of the fiber reinforced structure to be fabricated.

Figure 2:
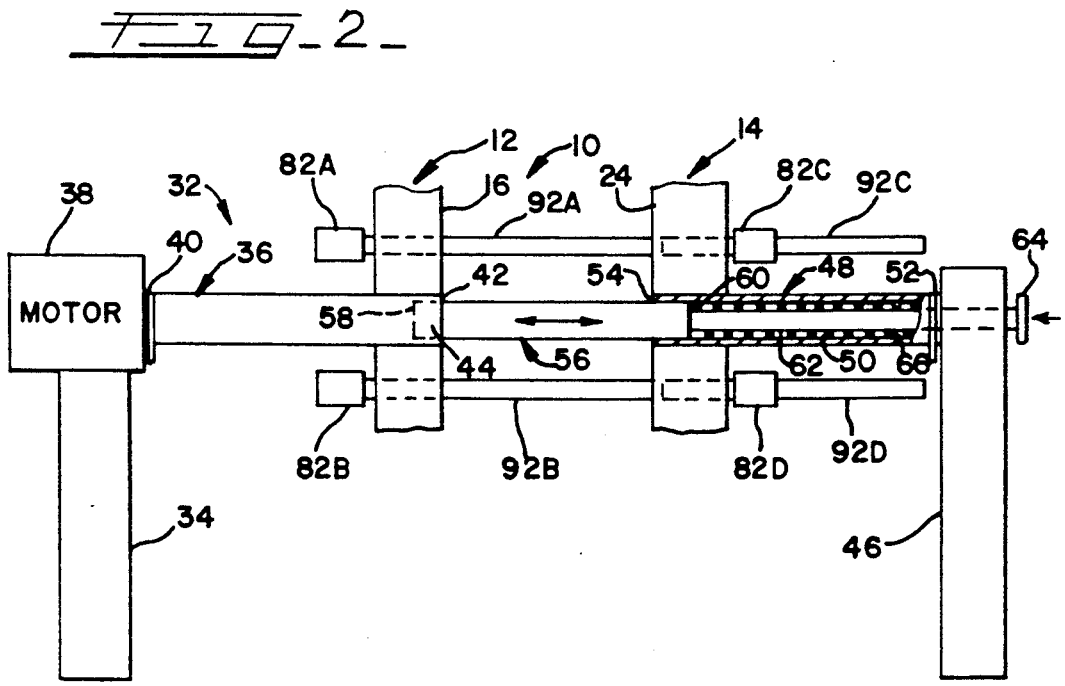
FIG. 2 is an elevational view of the drive mechanism showing the winding fixture partially broken away.

As shown in FIG. 2, the winding fixture 10 is rotated by a drive mechanism 32. The drive mechanism 32 includes a first pedestal 34 which rotatably supports a first shaft 36. A motor 38 is connected to the pedestal 34 and is in driving engagement with the first end 40 of the shaft 36. The second end 42 of the shaft 36 includes a hollow cylindrical socket 44 having splined walls. The second end 42 of the shaft 36 fits within aperture 43 of the first frame 12 and does not extend past the interior surface 16 of the first frame 12. The first frame 12 is releasably attached to the shaft 36. A second pedestal 46 rotatably supports a second shaft 48 having a bore 50 extending concentrically therethrough. The walls of the bore 50 are splined. The first end 52 of the shaft 48 is rotatably supported by the pedestal 46. The second end 54 of the shaft 48 fits within aperture 55 of the second frame 14 and does not extend past the interior surface 24 of the frame 14. The second frame 14 is releasably attached to the shaft 48.

A center shaft 56 extends between the second end 42 of shaft 36 and the second end 54 of the shaft 48. The center shaft 56 has a first splined end 58 which fits within and rotationally interlocks with the splined socket 44. The center shaft 56 has a second splined end 60 which rotationally interlocks with the splined bore 50 of shaft 48. A rod 62 of smaller diameter than the central shaft 56 is located within the bore 50. The rod 62 is attached to the second end 60 of shaft 56 and extends through the pedestal 46. A pull knob 64 is attached to the end of rod 62. A spring 66 is concentrically located around the rod 62 and biases the central shaft 56 into engagement with the shaft 36. When the central shaft 56 is interlocked with the socket 44, the rotation of shaft 36 will cause a similar rotation of shaft 48.

Alternatively as shown in FIG. 3, the central shaft 56 of the drive mechanism 32 may be omitted. In this embodiment the first shaft 68 and the second shaft 70 are solid. A first drive chain 72 is in driving engagement at one end with the shaft 68 and at the other end with the drive shaft 74. The drive shaft 74 extends from the first pedestal 34 to the second pedestal 46. A second drive chain 76 is in driving engagement with the drive shaft 74 and the second shaft 70. A rotation of shaft 36 will, through the drive shaft 74 and the drive chains 72 and 76, cause a similar rotation of shaft 48.

The first frame 12 includes slots 78A and 78B. Slot 78A extends from a location adjacent to the shaft 36 to a location near the first end 20 of the first frame 12. Slot 78B extends from a location adjacent to the shaft 36 to a location near the second end 22 of the first frame 12. The second frame 14 includes slots 78C and 78D. Slot 78C extends from a location adjacent to the shaft 48 to a location near the first end 28 of the second frame 14. Slot 78D extends from a location adjacent to the shaft 48 to a location near the second end 30 of the second frame 14. Although the slots 78A-D are shown as being linear, various curves and combinations of curved and linear 1 slots may also be used as desired.

Four tracks 80 are attached to the exterior surface 18 and four tracks 80 are attached to the exterior surface 26 of the frames 12 and 14. Each track 80 extends the length of and parallel to a respective side of each slot 78A-D. Solenoids 82A-D are respectively translatably mounted to a pair of tracks 80 which are located on either side of the slots 78A-D. Four rollers 84 are rotatably attached to each solenoid 82A-D, with two rollers 84 being rotationally and translatably engaged to a respective track 80 on each side of a slot 78A-D.

Two motors 86A-B are attached to the exterior surface 18 of frame 12 and two motors 86C-D are attached to the exterior surface 26 of the frame 14 on opposite sides of the shafts 36 and 48. A pulley 88 is located on the exterior surface 18 and 26 of each frame 12 and 14 near each respective end 20, 22, 28 and 30. Belts 90A-D respectively extend around a motor 86A-D and a pulley 88 so that each belt 90A-D is parallel to a respective slot 78A-D. Belts 90A and 90C are located above their respective slots 78A and 78C and belts 90B and 90D are located below their respective slots 78B and 78D. Each solenoid 82A-D is connected to a respective belt 90A-D and is independently translatable along its respective pair of tracks 80 to any desired location along its respective slot 78A-D.

A pin 92A-D is respectively connected to each solenoid 82A-D. The solenoids 82A-D extend or retract their associated pins 92A-D as desired and independently of one another. When fully extended, pin 92A will extend through slot 78A, past the interior surface 24 of the second frame 14, and into the opposing slot 78C. When fully retracted, pin 92A will be completely outside of the first frame 12. Pins 92B-D are similarly extendable and retractable.

Pins 92A and 92C constitute a right set of pins and pins 92B and 92D constitute a left set of pins. Initially as the winding process begins, as shown in FIG. 1, pin 92A will be located to the interior, closer to the shaft 56, than pin 92C. Pin 92C is thus initially located to the exterior of pin 92A. Similarly pin 92B is initially located to the interior of pin 92D. As the winding process continues, the right set of pins, pins 92A and 92C, will alternately be repositioned to the exterior of one another. Similarly, the left set of pins, pins 92B and 92D, will alternately be repositioned to the exterior of one another.

In operation, the winding fixture 10 is rotated about the central axis of the shafts 36, 48 and 56 by the motor 38 in a clockwise direction as indicated by the arrow X. The fixture 10 may also be rotated counterclockwise or may be alternately rotated back and forth between clockwise and counterclockwise directions. The pins 92A-D are initially located along their respective slots 78A-D as shown in solid lines in FIG. 1 with pins 92A and 92B being in the interior positions and pins 92C and 92D being located in the exterior positions. Pins 92A and 92B are initially extended and pins 92C and 92D are initially retracted. One or more fibers 11 are wound one or more times (a first series of wraps) around pins 92A and 92B as shown in FIG. 7. Pin 92C is then extended and the fibers 11 are wound around pin 92C as shown in FIG. 8. Pin 92D is then extended and the fibers are wound around pin 92D as shown in FIG. 9. Although only one wrap is shown, more than one wrap around pins 92C and 92D may occur at this step.

Pin 92A is then retracted. Motor 86A then rotates belt 90A thereby translating pin 92A to any desired new location 92A', as shown in FIG. 7 and as shown in phantom in FIG. 1, whereupon the pin 92A' is extended. The fibers 11 are then wound around pin 92A'. Pin 92B is then retracted and is translated by motor 86B and belt 90B to a new location 92B', as shown in FIG. 11 and in phantom in FIG. 1, whereupon the pin 92B' is extended. The fibers 11 are then wound around pin 92B'. Optionally, one or more additional wraps may be made about pins 92A' and 92B'.

Pin 92C is then retracted and translated by motor 86C and belt 90C to location 92C', as shown in FIG. 12 and in phantom in FIG. 1, whereupon pin 92C' is extended. The fibers 11 are then wound around pin 92C'. Pin 92D is then retracted and is translated by motor 86D and belt 90D to location 92D', as shown in FIG. 13 and in phantom in FIG. 1, whereupon pin 92D' is extended. The fibers 11 are then wound around pin 92D'. Optionally, one or more additional wraps may be made about pins 92C' and 92D'.

Pin 92A' is then retracted and is translated by motor 86A and belt 90A to position 92A", as shown in FIG. 14 and in phantom in FIG. 1, whereupon pin 92A" is extended. The fibers 11 are then wound around pin 92A". The repositioning of the interior pin of each set of pins to an exterior position is continued until the desired shape and size of the fiber reinforced structure is achieved. It is to be noted that the prime, double prime and triple prime designations of pins 92A-D are merely the repositioned locations of pins 92A-D and are not new elements.

The distance each pin 92A-D is translated between its interior position and its exterior position is discretionary. Each pin 92A-D may be translated a distance independent of the other pins and the distance each pin 92A-D is translated may be varied each time it is repositioned.

When the winding process is completed and the unwound fibers 11 are severed from the fiber reinforced structure, the structure may be removed by retracting all of the pins 92A-D and by pulling the knob 64 which will retract the central shaft 56 into the bore 50 of shaft 48 while compressing the spring 66. The fiber reinforced structure may then be removed from the fixture 11. The frames 12 and 14 may also then be removed from the shafts 36 and 48 if desired.

Various features of the invention have been particularly shown and described in connection with the illustrated embodiments of the invention, however, it must be understood that these particular arrangements merely illustrate, and that the invention is to be given its fullest interpretation within the term of the appended claims.

What is claimed is:

1. A method of forming a fiber reinforced structure using a winding fixture including a frame at least one set of pins for supporting a first end of the fiber reinforced structure, said set of pins including at least a first pin and a second pin, each said pin being retractable, extendable and translatable relative to said frame, and means for supporting a second end of the fiber reinforced structure comprising the steps of:
   a) winding said fiber continuously and selectively around said pins and said support means;
   b) retracting the first pin of said set of pins, translating the first pin to the opposite side of said second pin and extending said first pin;
   c) retracting said second pin of said set of pins, translating said second pin to the opposite side of said first pin and extending said second pin; and
   d) continuing to alternate the retraction, translation and extension of said first and second pins while winding said fiber around said first and second pins when extended to provide a fiber reinforced structure having one of various predetermined sizes and shapes.

2. A method of forming a fiber reinforced structure using a winding fixture including a frame and at least two sets of pins being retractable, extendable and translatable relative to said frame, each set including at least a first pin and a second pin, comprising the steps of:
   a) winding said fiber continuously and selectively around said pins;
   b) retracting the first pin of said pins, translating the first pin to the opposite side of said second pin and extending said first pin;
   c) retracting said second pin of said pins, translating said second pin to the opposite side of said first pin and extending said second pin; and
   d) continuing to alternate the retraction, translation and extension of said first and second pins while winding said fiber around said first and second pins when extended to provide a fiber reinforced structure having one of various predetermined sizes and shapes.

3. A method of forming a fiber reinforced structure using a winding fixture rotatable on a shaft, said fixture including at least one frame, a right set of retractable pins and a left set of retractable pins, each set of pins having a first and a second pin with each pin of each set of pins being retractable, extendable and translatable along said frame comprising the steps of:
   a) rotating said frame;
   b) extending the first pin of said right set of pins and of said left set of pins;
   c) winding said fibers around said first pins;
   d) extending the second pins of each said set of pins;
   e) winding said fibers around said second pins;
   f) retracting said first pin of said right set of pins, translating said first pin to a position exterior of said second pin of said right set of pins and extending said first pin;

g) winding said fiber around said first pin of said right set of pins;
h) retracting the first pin of said left set of pins, translating said first pin to a position exterior of said second pin of said left set of pins and extending said first pin;
i) winding said fiber around said first pin of said left set of pins;
j) retracting said second pin of said right set of pins, translating said second pin to a position exterior of said first pin of said right set of pins and extending said second pin;
k) winding said fiber around said second pin of said right set of pins;
l) continuing the pin translation and winding pattern until the desired shape and size of the fiber reinforced structure is achieved.

* * * * *